(No Model.)

L. H. & O. N. KIMBALL.
AUTOMATIC CENTER DELIVERY HAY RAKE.

No. 519,262. Patented May 1, 1894.

WITNESSES.
L. F. Sutton
W. Scott Nichols.

INVENTORS.
Lewis H. Kimball.
Owen N. Kimball.

UNITED STATES PATENT OFFICE.

LEWIS H. KIMBALL AND OWEN N. KIMBALL, OF IOWA, JACKSON COUNTY, IOWA.

AUTOMATIC CENTER-DELIVERY HAY-RAKE.

SPECIFICATION forming part of Letters Patent No. 519,262, dated May 1, 1894.

Application filed November 2, 1893. Serial No. 489,887. (No model.)

*To all whom it may concern:*

Be it known that we, LEWIS H. KIMBALL and OWEN N. KIMBALL, both citizens of the United States, residing in Iowa township, Jackson county, State of Iowa, have invented certain new and useful Improvements in Horse Hay-Rakes, of which the following is a specification.

Our invention relates to that class of horse hay rakes in which the rake teeth are periodically lifted and in which the hay gathered and discharged by the teeth is formed into a wind row parallel with the line of draft.

The primary object of our invention is to provide improved devices for automatically lifting the teeth periodically and discharging the hay therefrom, and improved devices for forming a wind row in the central line of draft.

Our invention also involves certain novel organizations of instrumentalities and details of construction hereinafter described and claimed.

Figure 2:
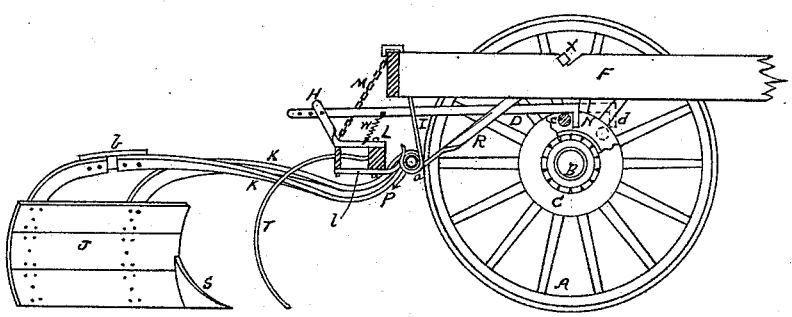
Figure 1:
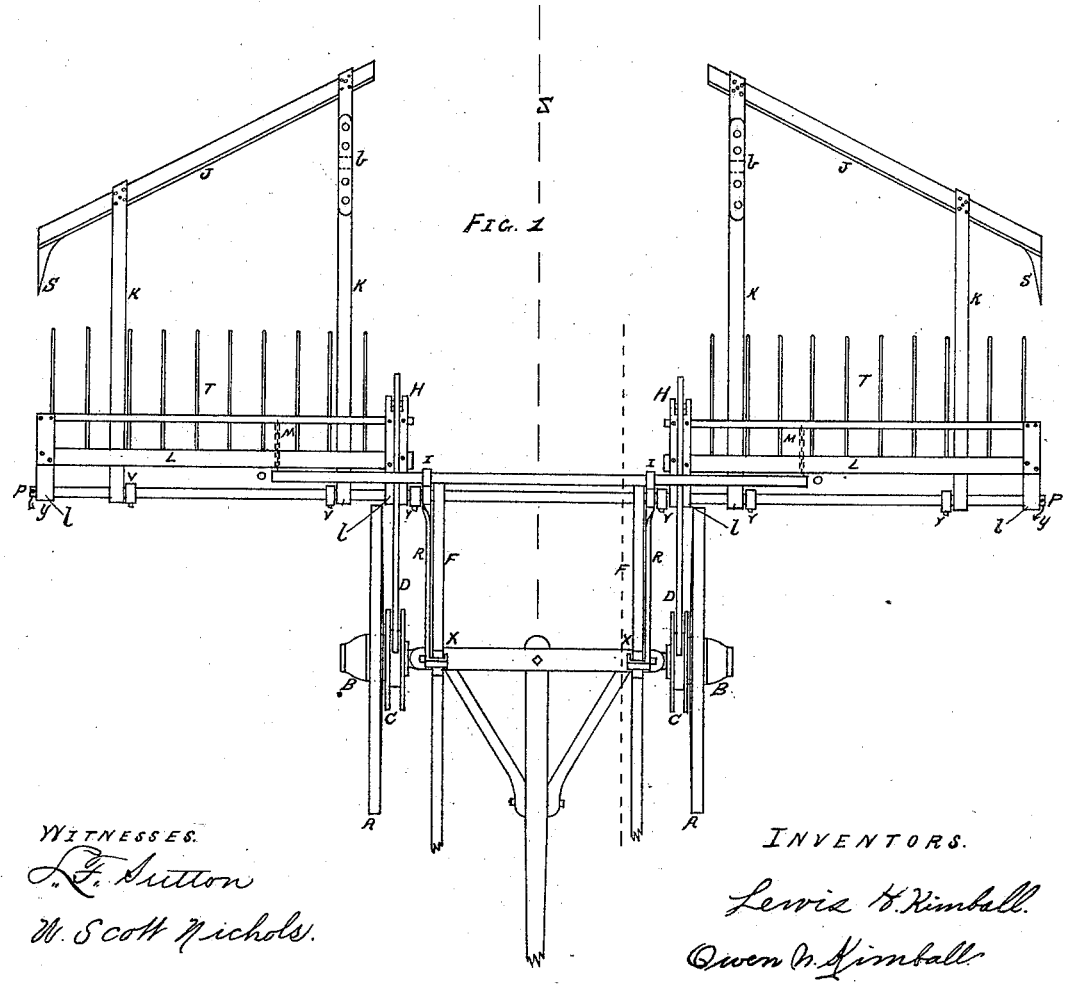

In the accompanying drawings, Figure 1 is a plan view of a horse hay rake embodying our invention, and Fig. 2 is a longitudinal, central section thereof.

The draft frame or sulky may be constructed in any suitable way, the frame or body F, being mounted and supported on the wheels A, in any desired manner. In brackets or hangers I, secured to the frame F, we mount a rod or tube P, which extends across the sulky frame in rear of the wheels, and in opposite directions on each side thereof.

We employ two rakes L, on opposite sides of the central line of draft, and connect the rake heads to the rod P, by brackets $l$, which are free to swing or hinged on the rod P. The rake head, and the teeth T, may be of any desired construction, but the inner ends of the rake are preferably separated, as indicated in Fig. 1. Adjustable collars $v$, on the rod P, are employed to hold the brackets $l$, against endwise movement on the rod P, and pins $y$, are employed at the ends of the rod for a similar purpose. Chains M, secured to the frame F, and to the rake heads, limit the downward movement of the rakes, and rods R, connected at $x$, to the sulky frame are connected at $a$, to the hangers I, to brace them and assist in supporting the rod P.

In order to lift the rakes to cause them to discharge the hay gathered by them, we provide means automatically operated by the wheels. The hubs B, of the wheels are provided with flanged annular guides C, between which extend the hooked ends N, of rods D, that are adjustably connected at H with the rake heads. Each flanged guide C, is provided with a transverse projection or roller $c$, with which the hook N, is adapted to engage.

In Fig. 2, the parts are shown in their normal position, with the rake teeth down, but as the machine progresses, the projection or roller $c$, will abut against the hooks N, and move them to the position $d$, indicated by dotted lines, thus moving the rods D, forward and raising the rakes and effecting the discharge of the hay gathered by the teeth T. After the rollers $c$, have moved from the position $d$, the hooks will be released and the rakes will drop to their working position. Springs W, are employed for holding the rods D in their normal position. It will be observed that only a single roller or projection $c$ is employed on each wheel, and that the rakes are lifted once in each revolution of the wheels, and that the parts are so arranged that the discharge of the hay is automatic, and is not controlled by the driver.

In order that a wind row may be formed in a line parallel with the central line of draft, we provide in rear of the rakes wind-row-formers J, one on each side of the line of draft, with their inner ends separated from each other and their outer ends in line with the outer ends of the rakes, and provided with shoes or dividers S, set at a slight inclination and arranged to gather all the hay discharged by the rakes and guide it into the path of the wind-row-formers J, which, as shown, are inclined backwardly from their front ends, so that the hay discharged by the rakes will be moved backwardly and inwardly to form a single wind-row in the central line of draft.

Preferably, the wind-row-formers J, are slightly curved or concaved, as shown in Fig.

2. They are of sufficient length to gather all the hay dropped by the rakes, and of a sufficient height to prevent the hay from moving over their upper edges. Rods k connect the wind-row-formers J with the cross rod P. Preferably, two rods k are employed for each wind-row-former J, and an adjustable connection b in one of each pair of rods may be employed to vary the inclination of the part J. The rods, as shown in Fig. 2, are curved and bent under the rake heads so as not to interfere with the working thereof.

We are aware that it is old to form a wind-row in the central line of draft by means of rakes set at a suitable angle relatively to a frame or sulky, but so far as we are aware, we are the first to provide a horse hay rake in which the rakes are transverse to the line of draft and are followed by wind-row-formers arranged at an angle to the line of draft on opposite sides thereof to move the hay inwardly and rearwardly as the machine progresses.

We claim as our invention—

1. The combination with a draft frame or sulky, of a rake, means for raising it to discharge the hay gathered thereby, and a wind-row-former in rear of the rake and inclined from its outer end backwardly and inwardly to guide the hay toward the central line of draft.

2. The combination with a draft frame or sulky, of a pair of rakes, one on each side of the line of draft, a pair of wind-row-formers in rear of the rakes and inclined from their front or outer ends rearwardly and inwardly, and means for operating the rakes to discharge the hay gathered thereby into the path of the wind-row-formers.

3. The combination of a draft frame, a rake, a wind-row former in rear thereof, and a shoe or divider on the outer front end of the wind-row-former.

4. The combination of a draft frame, a rake, a wind-row-former in rear thereof, and adjustable connections between the draft frame and the wind-row-former.

5. The combination of a draft frame, the cross rod P connected to the draft frame in rear of the wheels, the rakes hinged to the cross rod, and the wind-row-formers connected to the cross-rod and arranged in rear of the rakes.

6. The combination of the draft frame, the cross rod secured thereto in rear of the wheels, and extending laterally in opposite directions from the draft frame, a pair of rakes, one on each side of the central line of draft and separated from each other at their inner ends, connections between the rakes and the cross-rod, wind-row-formers in rear of the rakes connected to the cross-rod and inclined from their outer front ends rearwardly and inclined toward the central line of draft.

7. The combination of a sulky, comprising the wheels, axle and frame, of a projection or roller c, carried by one of the wheels, a hinged rake, and a rod connected with the rake and having a projection extending into the path of the projection or roller c, whereby the rake is lifted to discharge the hay gathered thereby automatically once in each revolution of the wheel.

8. A horse hay rake comprising a sulky, a hinged rake, and devices connecting the rake with the wheels and axle of the sulky to automatically lift the rake periodically as the sulky advances.

9. The combination of a draft frame or sulky, a pair of rakes connected therewith, projections carried by the hubs of the wheels, rods connected with the rakes, and extending into the path of the projections on the wheels, whereby the rakes are automatically lifted periodically as the sulky advances.

10. The combination of the sulky, the cross-rod secured thereto in rear of the wheels, rakes hinged to the rod, wind-row-formers also hinged to the rod and arranged in rear of the rakes on opposite sides of the central line of draft, guides on the wheels having lateral projections and hooked rods connected with the rakes and projecting into the path of the lateral projections in the guides, the organization being such that the rakes are lifted once in each revolution of the wheels, and the hay dropped by the rakes is collected by the wind-row-formers and formed into a single wind-row in the central line of draft.

LEWIS H. KIMBALL.
OWEN N. KIMBALL.

Witnesses:
M. A. WALSH,
F. W. LE PREVOST.